(12) United States Patent  (10) Patent No.: US 8,213,171 B2
Dean et al. (45) Date of Patent: Jul. 3, 2012

(54) COMPUTER STORAGE DEVICE RETENTION MECHANISM

(75) Inventors: Ronald P. Dean, Fort Collins, CO (US); Tom J. Searby, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 357 days.

(21) Appl. No.: 12/536,977

(22) Filed: Aug. 6, 2009

(65) Prior Publication Data

US 2011/0032671 A1 Feb. 10, 2011

(51) Int. Cl.
*H05K 7/14* (2006.01)

(52) U.S. Cl. ............ 361/679.33; 361/679.36; 312/223.2

(58) Field of Classification Search ............. 361/679.33–679.39, 744–727, 361/752, 730, 728, 741, 755, 756, 753, 724–727; 312/223.1–223.2
See application file for complete search history.

(56) References Cited

U.S. PATENT DOCUMENTS

| | | | |
|---|---|---|---|
| 5,668,696 A | 9/1997 | Schmitt | |
| 5,986,881 A * | 11/1999 | Yang | 361/679.32 |
| 6,157,540 A | 12/2000 | Eddings et al. | |
| 6,299,266 B1 | 10/2001 | Justice et al. | |
| 6,580,606 B1 | 6/2003 | Leman | |
| 7,471,509 B1 * | 12/2008 | Oliver | 361/679.33 |
| 7,486,509 B2 * | 2/2009 | Kim et al. | 361/679.34 |
| 2007/0014087 A1 * | 1/2007 | Kwak et al. | 361/685 |

* cited by examiner

*Primary Examiner* — Jinhee Lee
*Assistant Examiner* — Ingrid Wright

(57) ABSTRACT

An mechanism for retaining devices in a computer system is disclosed herein. A computer storage device enclosure includes an chassis configured to house a computer storage device. The chassis includes a storage device retention mechanism. The storage device retention mechanism includes a flexible retention member disposed along and connected to an outer side wall of the chassis. The flexible retention member is configured to retain a rear corner of the storage device installed in the chassis by contacting a side, rear and upper surface of the storage device at the rear corner.

17 Claims, 5 Drawing Sheets

COMPUTER STORAGE DEVICE RETENTION MECHANISM

BACKGROUND

Computer storage devices, such as hard drives, optical drives, etc., have been designed to have a variety of physical forms. For example, storage devices having 5.25 inch, 3.5 inch, or 2.5 inch widths are employed in various computer applications. Storage devices may also vary in height. For example, storage devices used in notebook computers may be of smaller height than similar storage devices used in desktop computers. Computers include storage device compartments (i.e., drive bays) for housing storage devices. The bays are generally configured to accommodate storage devices of a size most often used in that particular type of computer.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Computers often include one or more drive bays that are accessible from the front of the computer. Drive bays referred to as "half-height" bays are front accessible in many computers. "Half-height" refers to drive bays dimensioned to accommodate devices approximately 5.25 inches in width and 1.6 inches in height. Half-height bays are often intended to house optical disk drives, such as compact disk ("CD") drives, digital versatile disk ("DVD") drives, Blu-ray disk ("BD") drives, etc. It may be desirable to install in a computer drive bay, storage devices not intended for installation in the drive bay. For example, it may be desirable to install an optical disk drive ("ODD") sized for use in a notebook computer (i.e., a slim-line ODD) in a half-height drive bay. A slim-line ODD, for example, having dimensions of approximately 128 mm(width)×13 mm(height)×129 mm(depth) is not dimensioned for installation in a half-height drive bay. Embodiments of the enclosure disclosed herein provide a retention mechanism for installation of a computer storage device, for example, a slim-line ODD, without addition of screws to the ODD, and without the use of tools.

Figure 1:
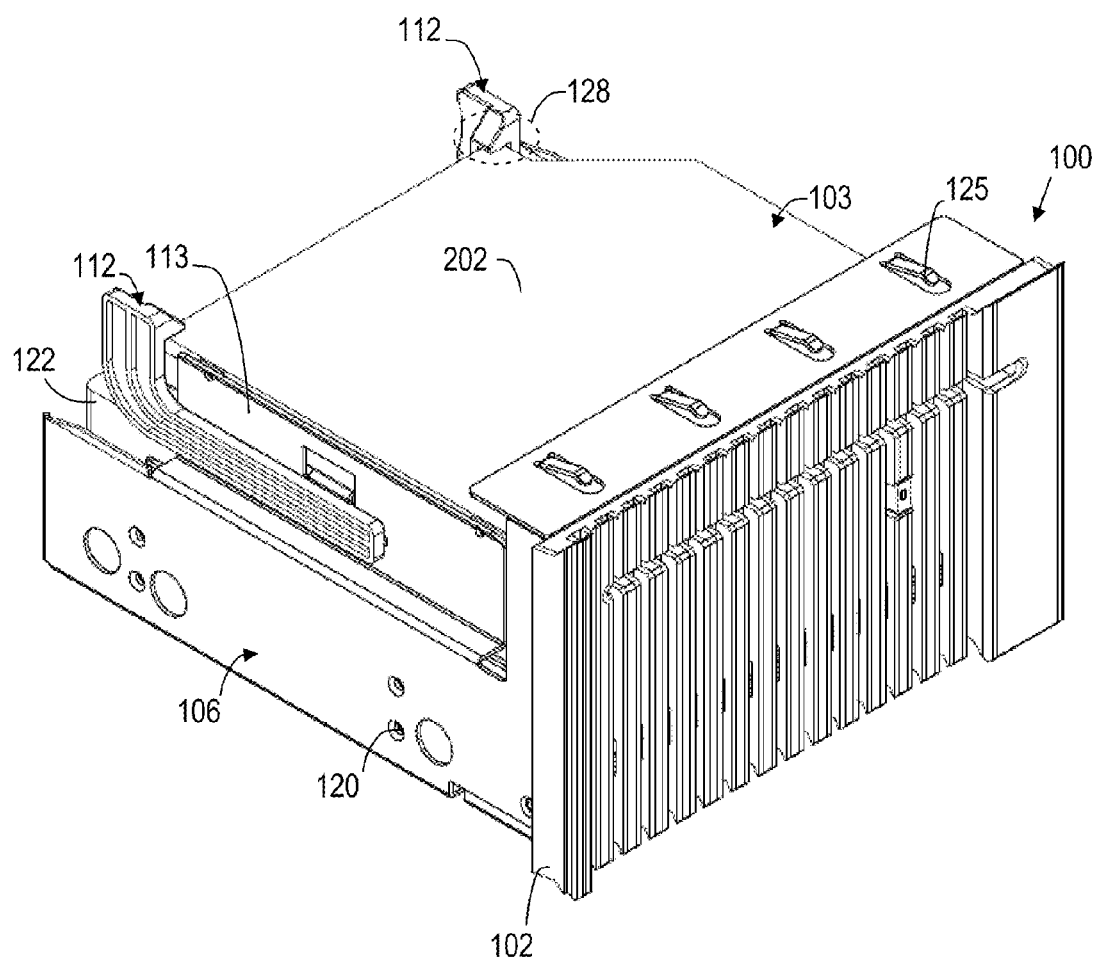
FIG. 1 shows a front isometric view of a computer storage device enclosure configured to occupy two drive bays in accordance with various embodiments.

FIG. 1 shows a computer storage device enclosure 100 configured to occupy two front accessible drive bays of a computer in accordance with various embodiments. Embodiments of the enclosure 100 may be configured to occupy one or more drive bays of a computer system drive cage. Embodiments of the enclosure may be integrated with the drive cage, or fixedly or removably installed in the computer drive cage. An embodiment of enclosure 100 may be mounted in the drive bay(s) of the computer enclosure by various means. For example, screws, a latching mechanism, etc. may be used. Thus, some embodiments of the enclosure 100 may include threaded holes 120. The enclosure 100 may include a bezel 102 attached to the metallic chassis 106 of the enclosure 100.

Embodiments of the enclosure 100 are configured to house one or more storage devices (e.g., 103, 122). The illustrated embodiment of the enclosure 100 is configured to house a slim-line slot-loading ODD 103. The front bezel of the ODD drive 103 is positioned behind the enclosure bezel 102 and is thus hidden from view.

Figure 2:
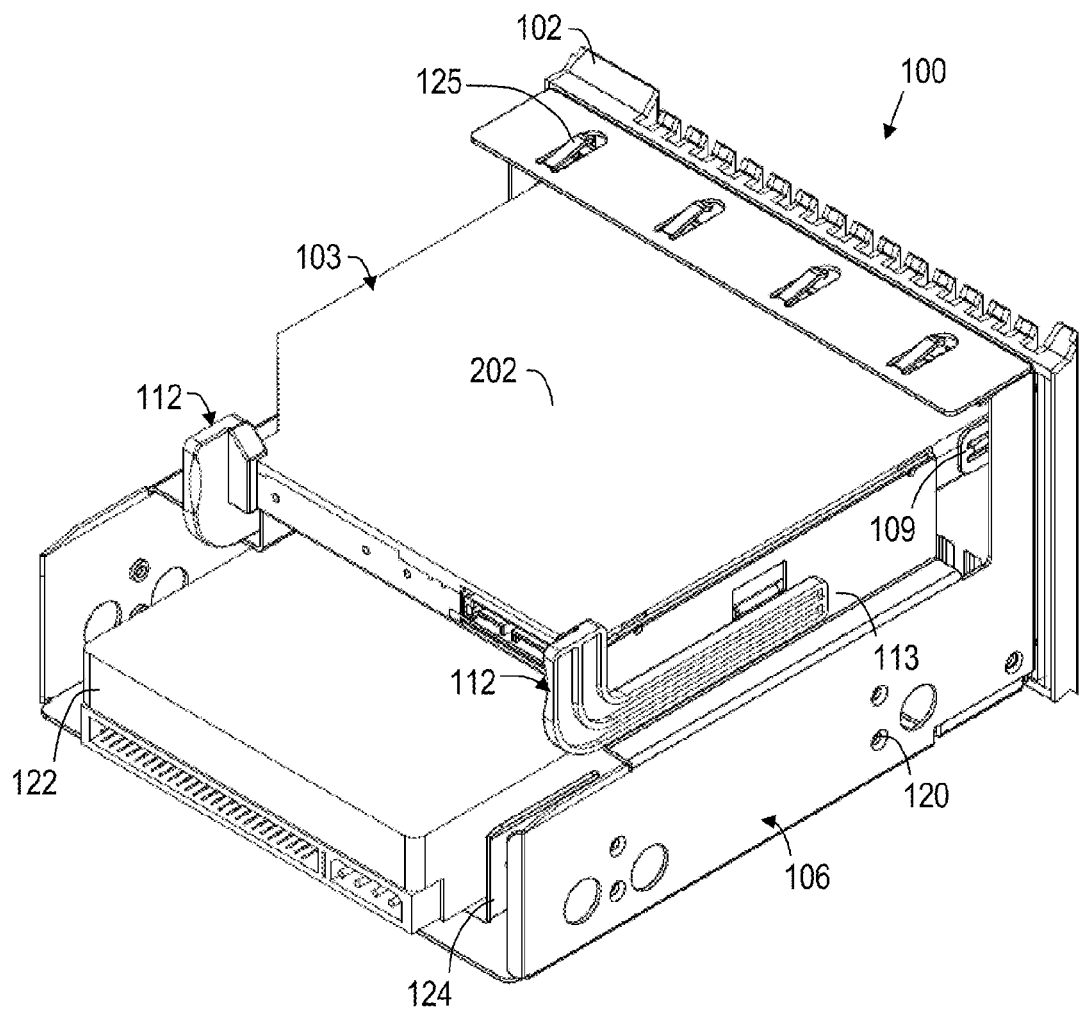
FIG. 2 shows a rear isometric view of a computer storage device enclosure configured to occupy two drive bays in accordance with various embodiments.

The slim-line ODD 103 can be mounted in the enclosure 100 without mounting screws and without tools. FIG. 2 shows a rear isometric view of a computer storage device enclosure 100 configured to occupy two drive bays. A slim-line ODD 103 is shown mounted in the enclosure 100.

Figure 3:
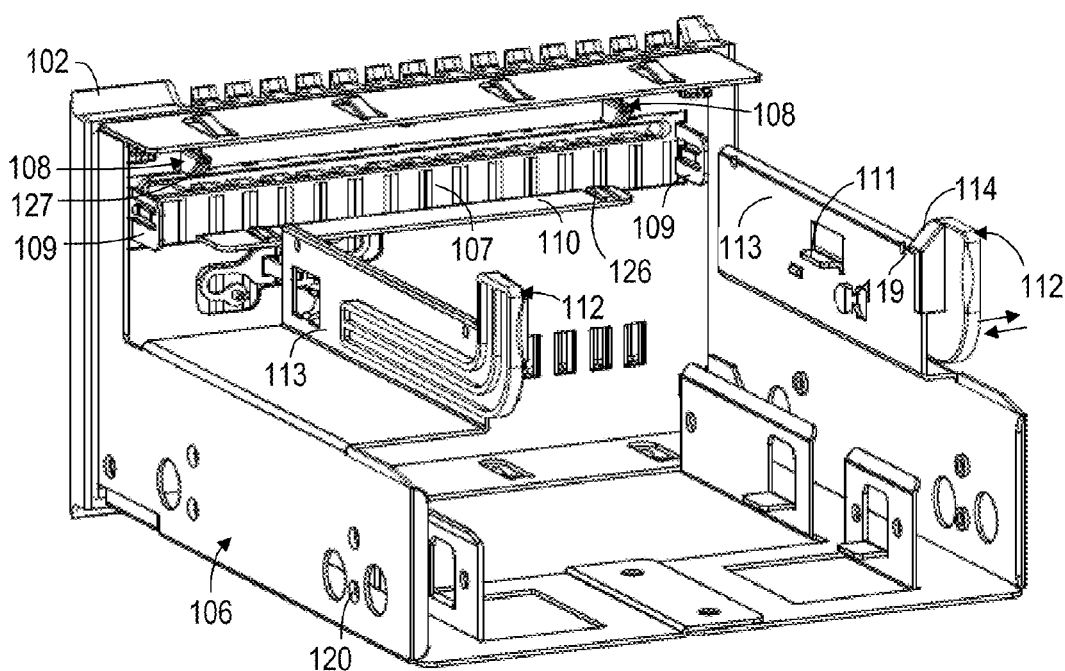
FIG. 3 shows a rear isometric view of an empty computer storage device enclosure configured to occupy two drive bays in accordance with various embodiments.

FIG. 3 shows a rear isometric view of an empty enclosure 100 in accordance with various embodiments. The various locating and retaining components of the retention mechanism provided by the enclosure 100 for screwless mounting of the ODD 103 include, for example, the front wall 107 of the enclosure chassis 106, upper front retainers 108, side front retainers 109, a lower front retainer 110, bottom side retainers 111, side walls 113, and rear retainers 112. The rear retainers 112 are formed of a flexible (i.e., elastic/resilient) material allowing for some lateral movement. The rear retainers 112 may be formed from any material having sufficient flexural mechanical properties to allow the deflection required for device insertion (e.g., approximately ¼ inch) and providing adequate retention force. In some embodiments, the rear retainers 112 are composed of a thermoplastic polymer, for example, polycarbonate. The retainers 107-111 may be fixed and of, for example, metal or plastic composition.

The side walls 113 are disposed in accordance with the side planes of the ODD 103. The bottom side retainers 111 protrude inward from the side retainers 113. The rear retainers 112 are attached to the side walls 113 (e.g., by retaining clips molded into the retainers 112 and inserted through the side walls 113).

Figure 4:
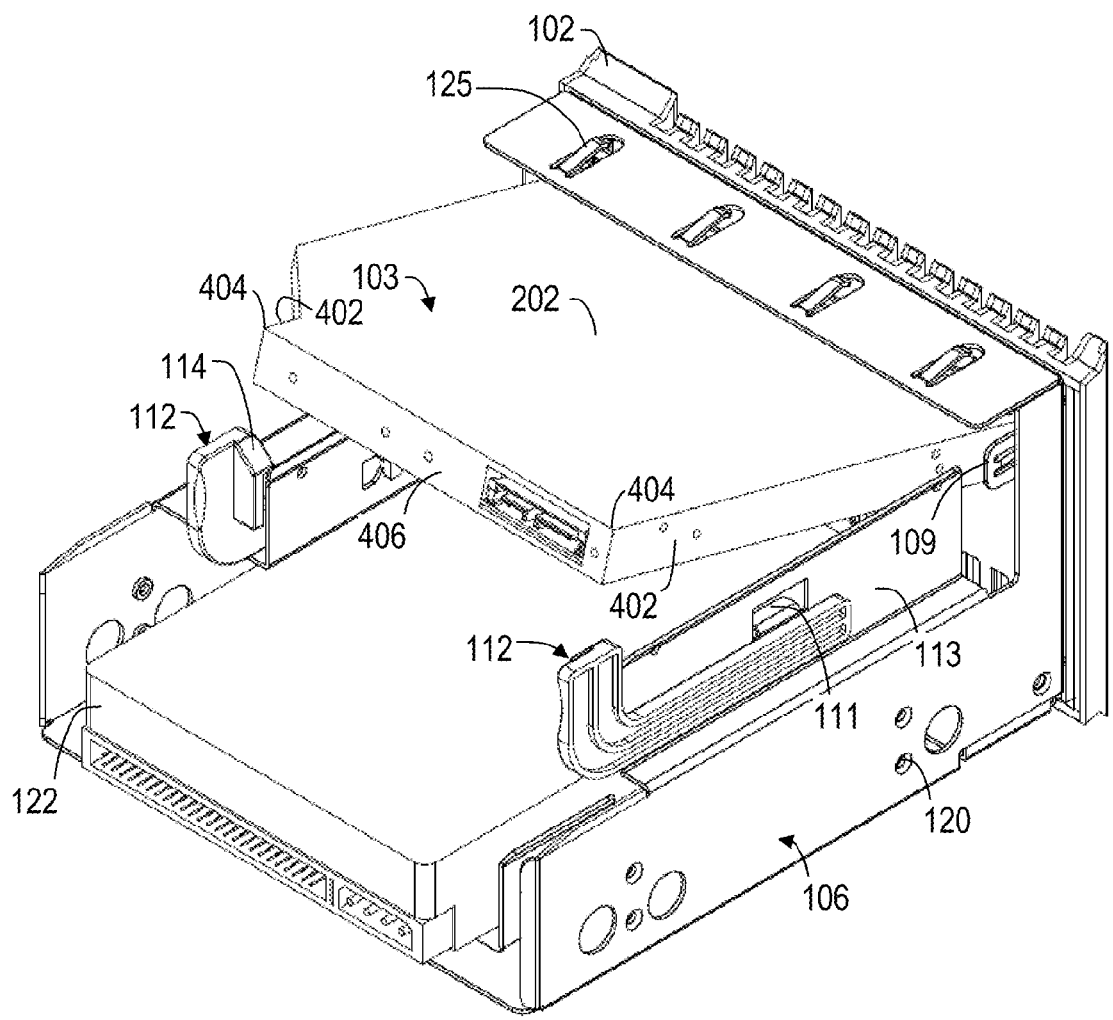
FIG. 4 shows a rear isometric view of a computer storage device enclosure configured to occupy two drive bays during installation of a slim-line optical disk drive ("ODD") in accordance with various embodiments.

Referring to FIGS. 2-4, the slim-line ODD 113 can be mounted in the enclosure 100 with the bezel of the ODD 103 positioned between the front retainers 108-110 and against the front wall 107 of the enclosure 100. The sides 402 of the ODD 103 are disposed between the side walls 113. The ODD 103 rests on the bottom side retainers 111. The flexible rear retainers 112 hold the back corners 404 of the ODD 103 in place.

The slim-line ODD 103 may be installed in the enclosure 100 as follows. The bezel of the ODD 103 is inserted between the front retainers 108-110. FIG. 4 shows a rear view of the enclosure 100 as a slim-line ODD 103 is being installed. Referring to FIGS. 3-4, the upper front retainers 108 may include an inclined surface 127 to aid in guiding the bezel of the ODD 103 into the proper position. The bottom of the ODD bezel rests on the lower front retainer 110. In some embodiments, the lower front retainer 110 includes a movable conductive structure 126 configured to make electrical contact with a conductive surface of the storage device. In some embodiments, the side front retainers 109 also comprise such contacts.

The rear 406 of the ODD 103 is lowered into contact with the flexible rear retainers 112. Downward force applied via the rear of the ODD 103 as it contacts the inclined surface 114 of the rear retainers 112 causes the flexible rear retainers 112 to displace outward laterally away from the ODD 103. When the upper surface of the ODD 103 passes below the upper retaining surface 119 (FIG. 3) of the rear retainers 112, and the bottom surface of the ODD 103 comes to rest on the bottom side retainers 111, the rear retainers 112 spring back into position and hold the rear of the ODD 103 in place in the enclosure 100. Some embodiments of the rear retainers 112 make contact with and hold only the rear corner edges 404 of the ODD 103. Detail 128 (FIG. 1) shows that the rear retainers 112 wrap-around the rear corners 404 of the ODD 103 making contact with the ODD 103 at the rear 406, side 402 and top 202 surfaces of the ODD rear corners 404, thereby restraining the ODD 103 from moving backward and upward in the enclosure 100.

The internal mechanisms of the ODD 103 are somewhat delicate and cannot withstand excessive force applied to the top surface of the ODD 103. Consequently, the enclosure 100 minimizes contact with the top 202 of the ODD 103. Some embodiments of the enclosure 100 contact the top of the ODD 103 only at the top of the ODD 103 bezel and at the rear corners 404.

Figure 5:
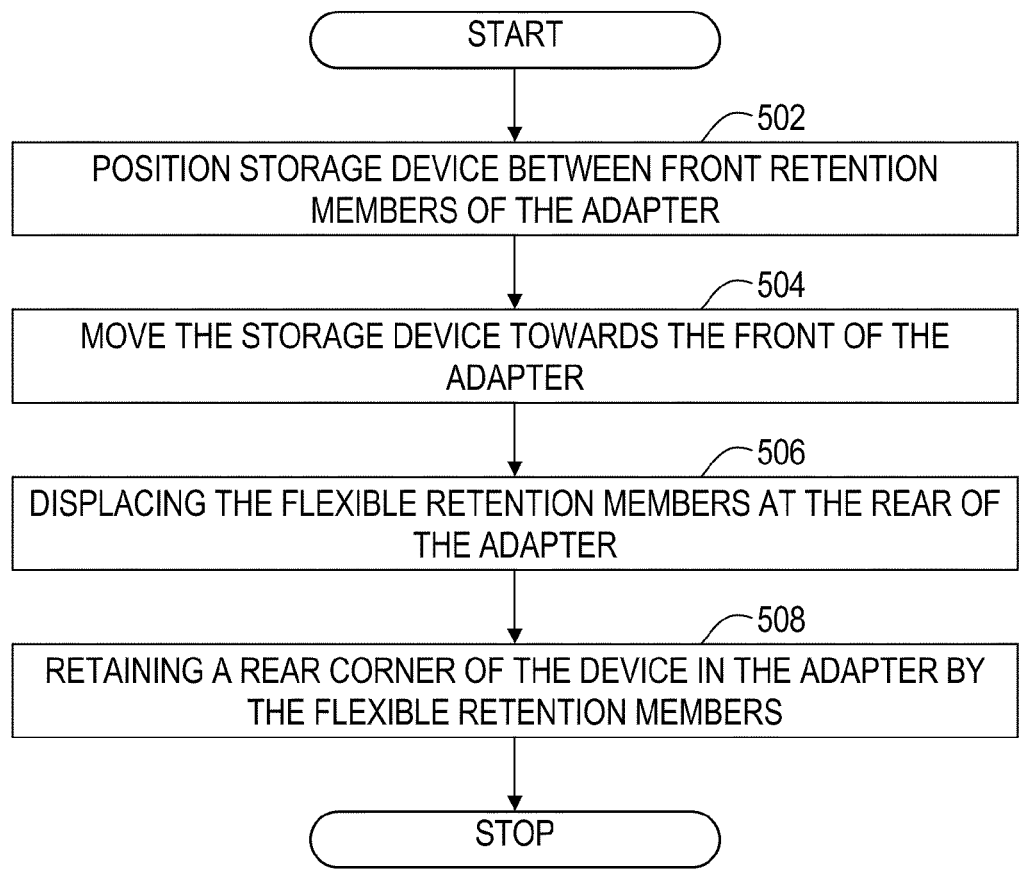
FIG. 5 shows a flow diagram for a method for installing a slim-line ODD in a computer storage device enclosure in accordance with various embodiments.

FIG. 5 shows a flow diagram for a method for installing a computer storage device 103 in a computer storage device enclosure 100 in accordance with various embodiments. Though depicted sequentially as a matter of convenience, at least some of the actions shown can be performed in a different order and/or performed in parallel. Additionally, some embodiments may perform only some of the actions shown.

In block 502, a computer storage device 103 is being installed in a computer storage device enclosure 100. The enclosure 100 may be installed in a drive bay of a computer prior to or after the storage device 103 is mounted. The front end (e.g., the bezel) of the storage device 103 is positioned between the front retention members 108, 109, 110 of the enclosure 100. The storage device 103 is moved towards the front of the enclosure (i.e., towards the front wall 107) in block 504. The storage device may be guided into position by an inclined surface 127 of the upper front retainers 108.

In block 506, the front surface of storage device 103 (e.g., the bezel) may be in contact with the front wall 107 of the enclosure 100. The rear 406 of the storage device 103 is moved downward between the flexible rear retainers 112 displacing the flexible rear retainers 112 outward and allowing the storage device 103 to move downward between the retainers 112. Displacement of the flexible rear retainers 112 may be facilitated by downward force applied to the inclined surfaces 114 of the retainers 112 via the storage device 103.

When the top surface 202 of the storage device 103 passes below the upper retaining surface 119 of the flexible rear retainers 112, the flexible rear retainers 112 move inward to retain the rear corners 404 of the storage device 103 in block 508.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer storage device enclosure, comprising: a chassis to house a computer storage device, the chassis comprising storage device retention mechanism including: a flexible retention member disposed along and connected to an outer side wall of the chassis, and to retain a rear corner of the storage device installed in the chassis by contacting a side, rear and upper surface of the device at the rear corner; and a fixed retention member disposed at a front of the chassis and to retain at least one of a front upper face, a front side face, and a front lower face of the storage device.

2. The computer storage device enclosure of claim 1, wherein the fixed retention member is to retain the front upper surface of the storage device and comprises an inclined surface to guide the storage device into position during installation of the storage device.

3. The computer storage device enclosure of claim 1, wherein the fixed retention member is to retain the front side face of the storage device and comprises a movable conductive structure to make electrical contact with a conductive surface of the storage device.

4. The computer storage device enclosure of claim 1, wherein the storage device enclosure is to retain the storage device without installation of mounting screws in the storage device.

5. The computer storage device enclosure of claim 1, wherein the storage device enclosure comprises a pair of flexible retention members, each disposed to retain a different rear corner of the storage device.

6. The computer storage device enclosure of claim 1, wherein the storage device enclosure comprises two opposing sides and a support member projecting inward from each side, each support member to support a bottom side surface of the storage device.

7. The computer storage device enclosure of claim 1, wherein the enclosure is to be removably installed in a computer chassis, and to house a slim-line optical disk drive.

8. The computer storage device enclosure of claim 7, wherein the enclosure is to mount the slim-line optical disk drive without installation of mounting screws in the slim-line optical disk drive and without use of tools.

9. The computer storage device enclosure of claim 1, wherein the flexible retention member comprises an inclined face to cause lateral displacement of the flexible retention member as the storage device is moved into contact with the flexible retention member.

10. A computer system, comprising: a storage device enclosure disposed in a drive cage of the enclosure of the computer system, the storage device enclosure to house a storage device; wherein the storage device enclosure comprises a flexible retention member disposed along an outer side wall of the storage device enclosure and to retain a rear corner of a first storage device installed in the storage device enclosure; wherein the flexible retention member is to wrap around the rear corner of the first storage device and wherein the flexible retention member comprises an inclined face to cause lateral displacement of the flexible retention member as the first storage device is moved into contact with the flexible retention member.

11. The computer system of claim 10, wherein the storage device enclosure further comprises: a first fixed retention member disposed at the front of the storage device enclosure to retain a front upper face of the first storage device, the fixed retention member comprising an inclined surface to guide the first storage device into position during installation of the first storage device; a second fixed retention member disposed at the front of the storage device enclosure to retain a front side face of the first storage device; and a third fixed retention member disposed at the front of the storage device enclosure to retain a front lower face of the first storage device; wherein at least one of the first, second and third fixed retention members comprises a conductive structure to make electrical contact with a conductive surface of the first storage device.

12. The computer system of claim 10, wherein the storage device enclosure is to retain the first storage device without addition of screws to the first storage device.

13. The computer system of claim 10, wherein the storage device enclosure comprises a pair of flexible retention members, each disposed to retain a different rear corner of the first storage device.

14. The computer system of claim 10, wherein the storage device enclosure comprises two opposing sides and a support member projecting from each side, each support member to support a bottom side surface of the first storage device.

15. The computer system of claim 10, further comprising a slim-line optical disk drive serving as the first storage device.

16. The computer system of claim 10, wherein the storage device enclosure is to be removably installed in the computer enclosure.

17. A method, comprising:
positioning a computer storage device between bottom, side and top retention members disposed at a front surface of a computer storage device enclosure;
moving the device between the retention members toward the front of the storage device enclosure;
laterally displacing inclined faces of a set of flexible retention members disposed at the rear of the storage device enclosure as the device passes between the retention members; and
retaining a rear corner of the device in the storage device enclosure by contact of the rear, side and top surfaces of the device corners with the flexible retention members.

* * * * *